United States Patent
Faltaous et al.

(10) Patent No.: US 10,922,953 B2
(45) Date of Patent: Feb. 16, 2021

(54) MULTIPLE PURPOSE SENSOR AND SECURITY SYSTEM

(71) Applicant: Olarm Alarm Service, Inc., San Diego, CA (US)

(72) Inventors: Joseph Faltaous, San Diego, CA (US); Michael Nessim, San Diego, CA (US)

(73) Assignee: Olarm Alarm Service, Inc., San Diego, CA (US)

( * ) Notice: Subject to any disclaimer, the term of this patent is extended or adjusted under 35 U.S.C. 154(b) by 0 days.

(21) Appl. No.: 16/409,646

(22) Filed: May 10, 2019

(65) Prior Publication Data
US 2019/0347925 A1 Nov. 14, 2019

Related U.S. Application Data

(60) Provisional application No. 62/669,827, filed on May 10, 2018.

(51) Int. Cl.
*G08B 25/00* (2006.01)
*H04W 4/029* (2018.01)
*G08B 13/22* (2006.01)

(52) U.S. Cl.
CPC .......... *G08B 25/008* (2013.01); *G08B 13/22* (2013.01); *H04W 4/029* (2018.02)

(58) Field of Classification Search
CPC .... G08B 13/189; G08B 13/22; G08B 25/008; G08B 25/08; G08B 25/10
See application file for complete search history.

(56) References Cited

U.S. PATENT DOCUMENTS

| | | |
|---|---|---|
| 9,197,985 B2 | 11/2015 | Seo et al. |
| 9,311,808 B2 | 8/2016 | Nurmela et al. |
| 9,412,260 B2 | 8/2016 | Kates |
| 9,552,719 B1 | 1/2017 | Dey et al. |
| 9,743,402 B2 | 8/2017 | Suresh |
| 2011/0141276 A1* | 6/2011 | Borghei ............... H04W 12/08 348/143 |
| 2014/0253328 A1 | 9/2014 | Craig |
| 2016/0343237 A1 | 11/2016 | Herman et al. |
| 2017/0039838 A1* | 2/2017 | Lee ...................... G08B 25/008 |
| 2017/0280210 A1 | 9/2017 | Morard et al. |
| 2017/0359412 A1 | 12/2017 | Haebler et al. |
| 2018/0006758 A1 | 1/2018 | Filson et al. |
| 2018/0066861 A1 | 3/2018 | Rabb et al. |
| 2018/0070222 A1 | 3/2018 | Narang et al. |

* cited by examiner

*Primary Examiner* — Omeed Alizada
(74) *Attorney, Agent, or Firm* — Inskeep IP Group, Inc.

(57) ABSTRACT

A smart home security system is described having multi-purpose sensor devices in communication with one more hub devices in further communication with the Internet and wireless carriers. The system is fully autonomous and does not require user interaction to arm and disarm the system, because the system senses and tracks when the user occupants leave their residence and when they arrive. The system also detects if the occupants are sleeping at night and will induce certain settings, such as a universal arming of the system (e.g., ARM STAY), which secures all protected entrances (doors, windows), and disables the motion sensors.

4 Claims, 15 Drawing Sheets

MULTIPLE PURPOSE SENSOR AND SECURITY SYSTEM

RELATED APPLICATIONS

This application claims priority to U.S. Provisional Application Ser. No. 62/669,827 filed May 10, 2018 entitled Multiple Purpose Sensor and Security System, which is hereby incorporated herein by reference in its entirety.

BACKGROUND OF THE INVENTION

Security systems have become an increasingly popular addition to a user's home, business, or similar building structure. These systems typically allow the user to toggle between an "armed" mode, in which certain activities activate an alarm, or a "disarmed" mode, in which certain activities do not activate an alarm.

However, current home security systems have several disadvantages. First, they tend to be expensive and complicated to install. Typically, sensors must be installed on points of entry (e.g., door and window sensors), motion sensors are installed in some or all rooms, activation keypads are installed near points of entry, and all components are wired together to a central control unit that coordinates the activity of the devices. Since sensor placement typically requires a certain degree of precision and wired components often require running wires through walls, expensive professional contractors are usually needed for proper installation.

Second, most home security systems rely solely on the user to know when it should be activated or deactivated. If the user forgets to arm the system when leaving the house, the security system will not become armed. Similarly, if a user decides to arm the system without knowing that another user is still on the premises, a false alarm may occur.

In this respect, what is needed is an improved home security system that is easier for a user to set up themselves and can make more intelligent decisions about when the system should be armed or disarmed.

SUMMARY OF THE INVENTION

Monitoring security of a residence, office or other building involves numerous potential conditions to monitor. Security and environmental conditions include for example, the presence or non-presence of owners/occupants or other motion, the status of doors, windows, and smart locks, and conditions indicating fires, water leaks, and gas leaks. In one embodiment, multifunction sensor devices are advantageously used to monitor and detect any or all of such conditions. Each multifunction sensor device can be programmed to monitor a specific sensor variable or many different sensor variables from each sensor at once. Sensor devices wirelessly transmit information about conditions and receive information about sensor settings from controllers (the hub device). The present invention provides a system including several multipurpose, highly portable and inexpensive sensor devices in communication with at least one controller/hub so that users can monitor security via access to wireless applications in communication with such controllers and sensors.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
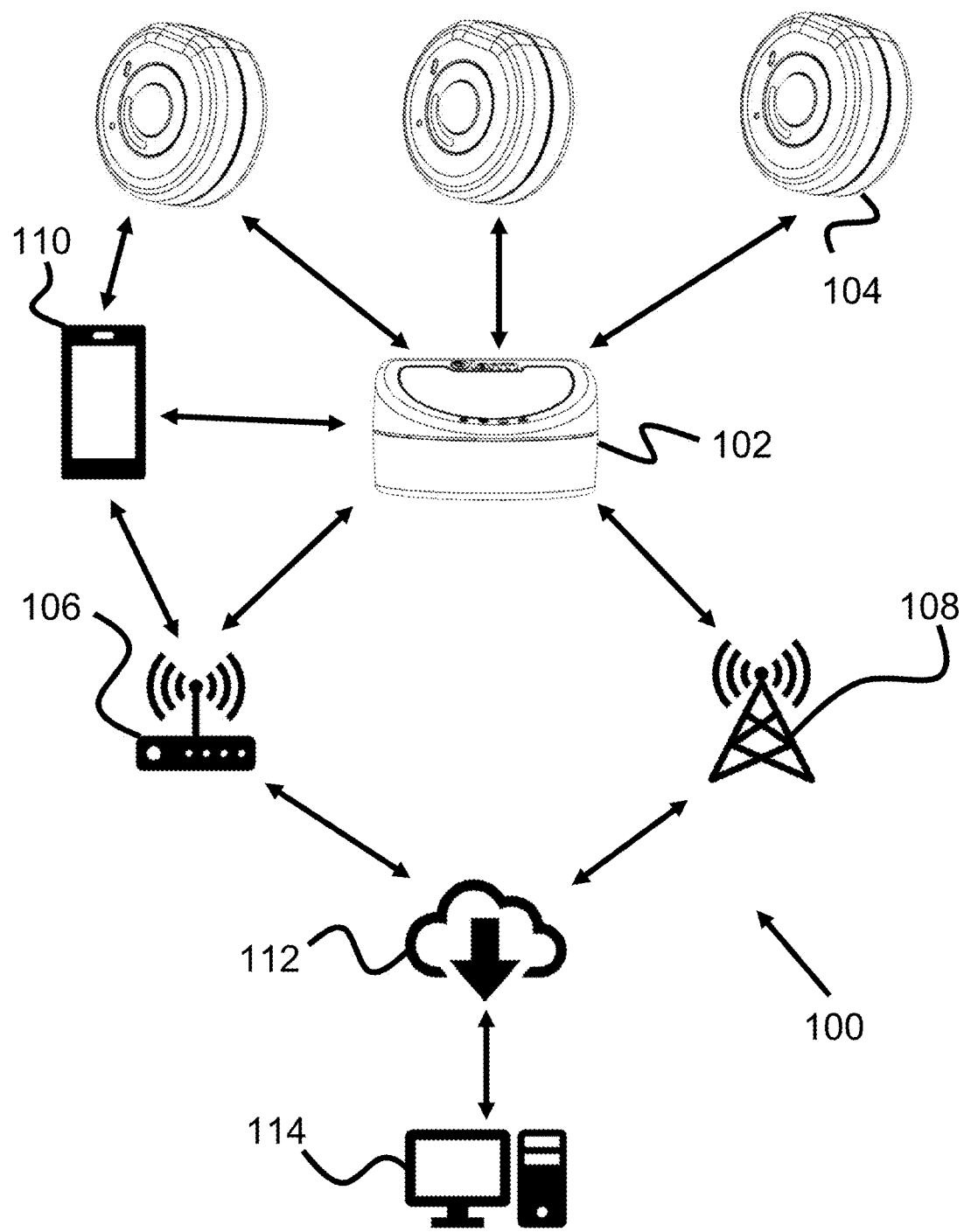
FIG. 1 illustrates a representation of a security system and the components thereof according to one embedment of the present invention.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The invention comprises a smart home security system using multipurpose sensor devices in communication with one more hub devices in communication with the Internet and wireless carriers. The system is fully autonomous and does not require user interaction to arm and disarm the system, because the system senses and tracks when the user occupants leave their residence and when they arrive. The system will also detect if the occupants are sleeping at night and will induce certain settings, such as a universal arming of the system (e.g., ARM STAY), which secures all protected entrances (doors, windows), and disables the motion sensors.

The present application may be more fully appreciated in connection with the following detailed description taken in conjunction with the accompanying figures.

FIG. 1 illustrates a representation of a security system 100 for a residence, office, or other building. The system 100 includes a plurality of wireless sensor devices 104 that are placed at various locations throughout a building. The sensor devices 104 wirelessly communicate data (e.g., sensor data) to a single, central controller or hub device 102 that is also located in the building. The hub device 102 processes and/or further transmits this data via the internet 112 (e.g., by the user's Wi-Fi router 106 or via cellular network 108) to server 114 of an alarm services company. Preferably, all sensor data, settings, configuration files, and similar data are stored in one or more database files on the server 114. Hence, while sensor data storage and analysis of sensor data can be performed by the sensor devices 104 and/or hub 102, the server 114 preferably handles these tasks. The user can setup the system 100, access data, and control settings via an app on their cell phone (or similar device), which either directly interacts with the hub 102 or directly with the server 114. Further details of the hardware of the system and processes executed by the system are described in further detail below.

The hub device 102 and sensor devices 104 may by generally referred to as sensor nodes and may further include a processor or control circuitry, storage, memory, input/output circuitry, sensor hardware to provide each function listed above (e.g., for multipurpose sensors), and communications circuitry. Control circuitry can include any processing circuitry or processor operative to control the operations and performance of multipurpose sensors. Storage can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory and storage can be combined as a single storage medium. Input/output circuitry can be operative to convert (and encode/decode, if necessary) analog signals and other signals into digital data. Input/output circuitry can be coupled to or include any suitable input mechanism, such as for example, a button, keypad, dial, a click wheel, or a touch screen, as well as any suitable output circuitry associated with output devices (e.g., audio outputs or display circuitry or components). Communications circuitry can include circuitry for connecting to a communications network and to transmitting communications (e.g., voice or data) to other devices within the communications network using any suitable communications protocol (e.g., Wi-Fi, Bluetooth®, radio frequency systems, infrared, GSM, GSM plus EDGE, CDMA, quadband, and other cellular protocols, VOIP, or any other suitable protocol). In some embodiments, such devices, including significantly the hub, can include a bus operative to provide a data transfer path for transferring data to, from, or between control processor, storage, memory, input/output circuitry, communications circuitry, and any other component therein.

Figure 2:
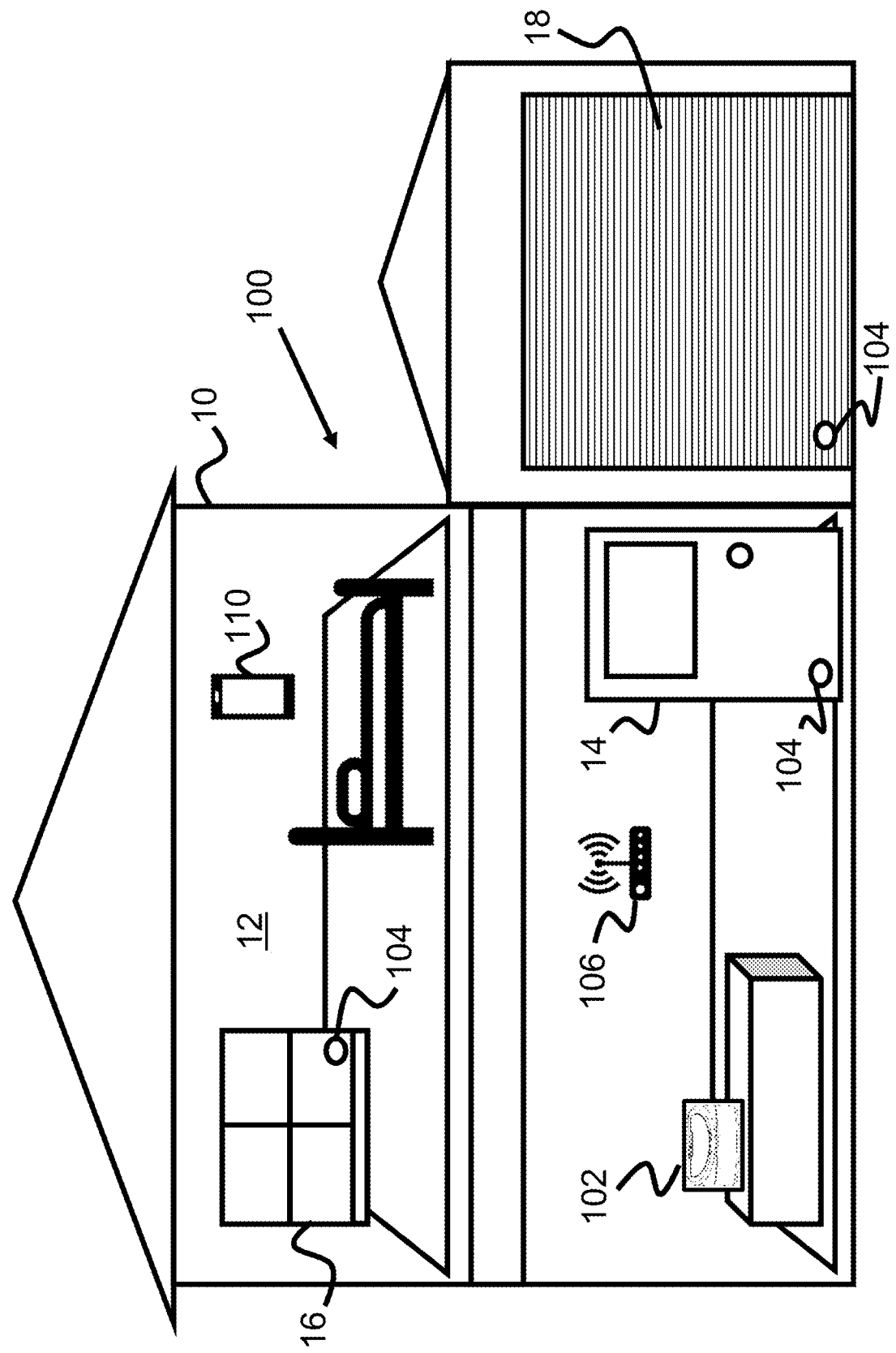
FIG. 2 illustrates a representation of a building with a security system and the components thereof according to one embedment of the present invention.
Figure 3:
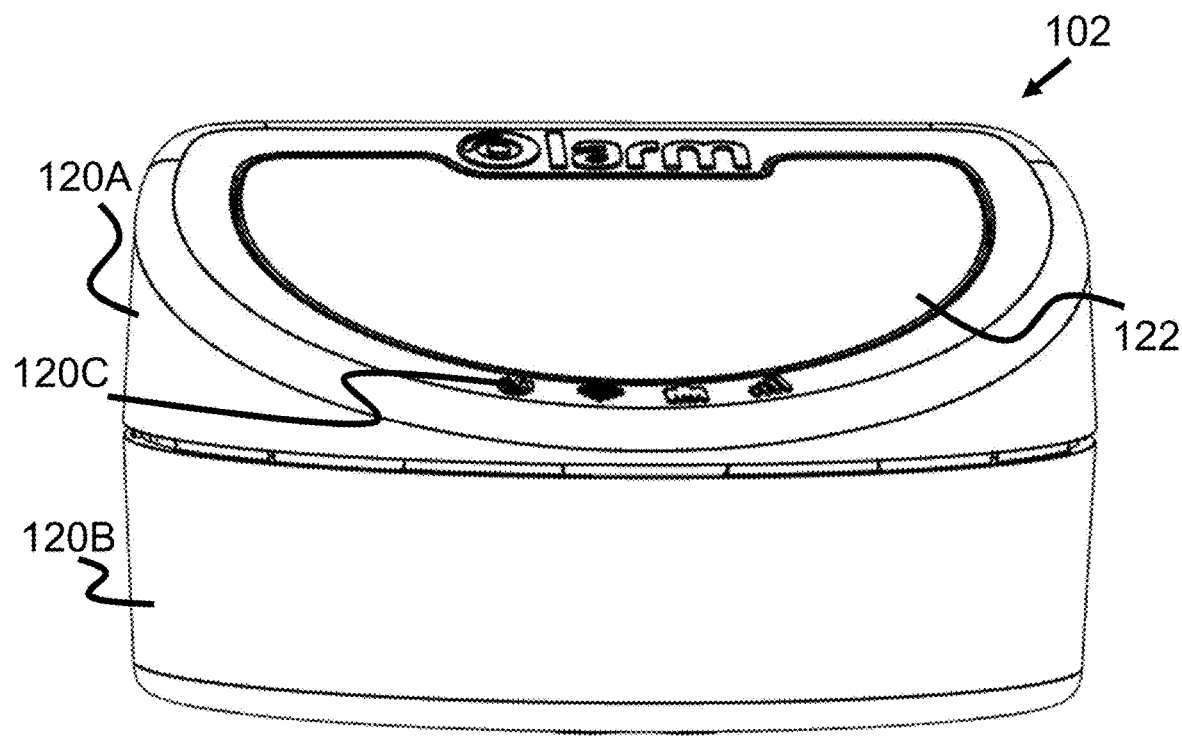
FIG. 3 illustrates a representation of a hub device of a security system according to one embedment of the present invention.
Figure 4:
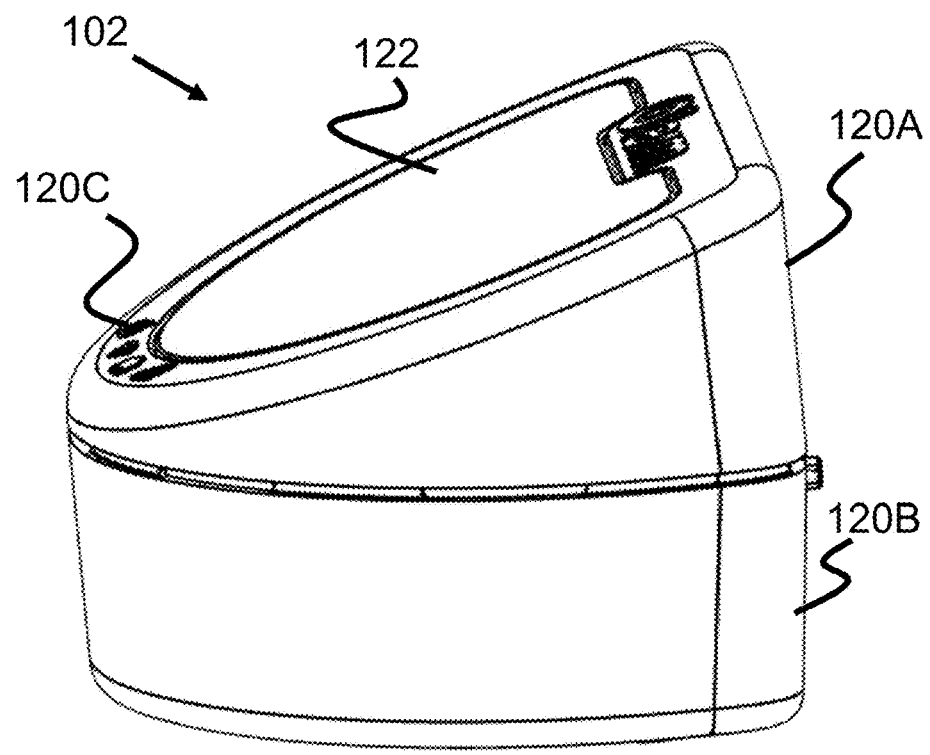
FIG. 4 illustrates a representation of a hub device of a security system according to one embedment of the present invention.
Figure 5:
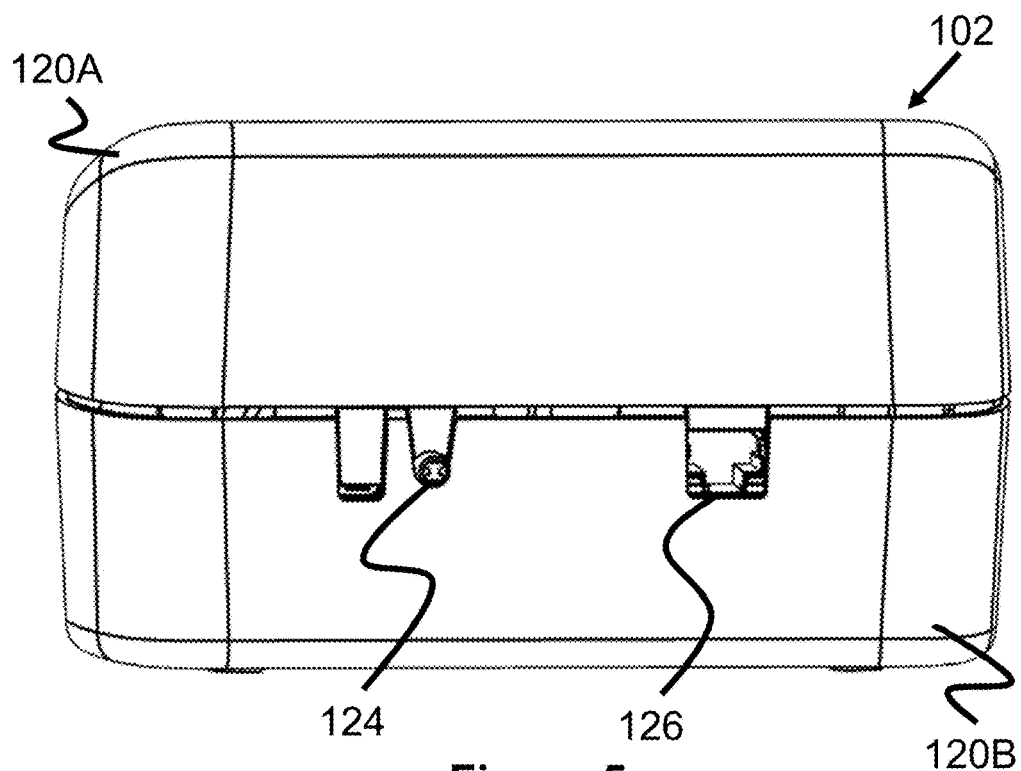
FIG. 5 illustrates a representation of a hub device of a security system according to one embedment of the present invention.
Figure 6:
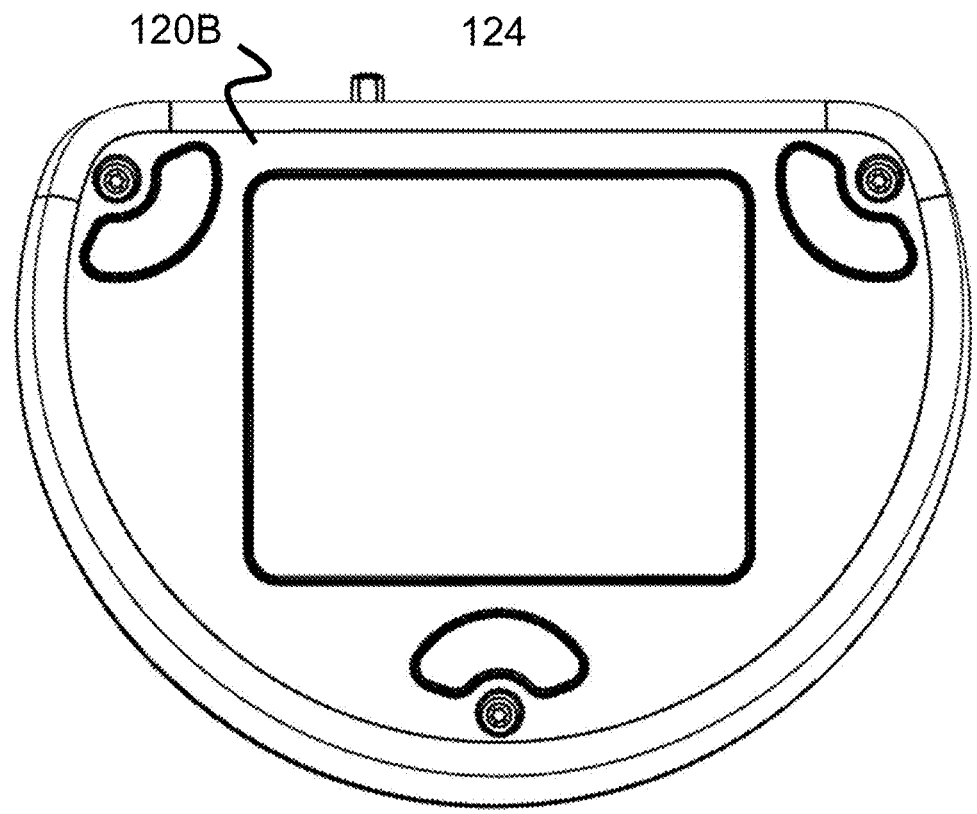
FIG. 6 illustrates a representation of a hub device of a security system according to one embedment of the present invention.
Figure 7:
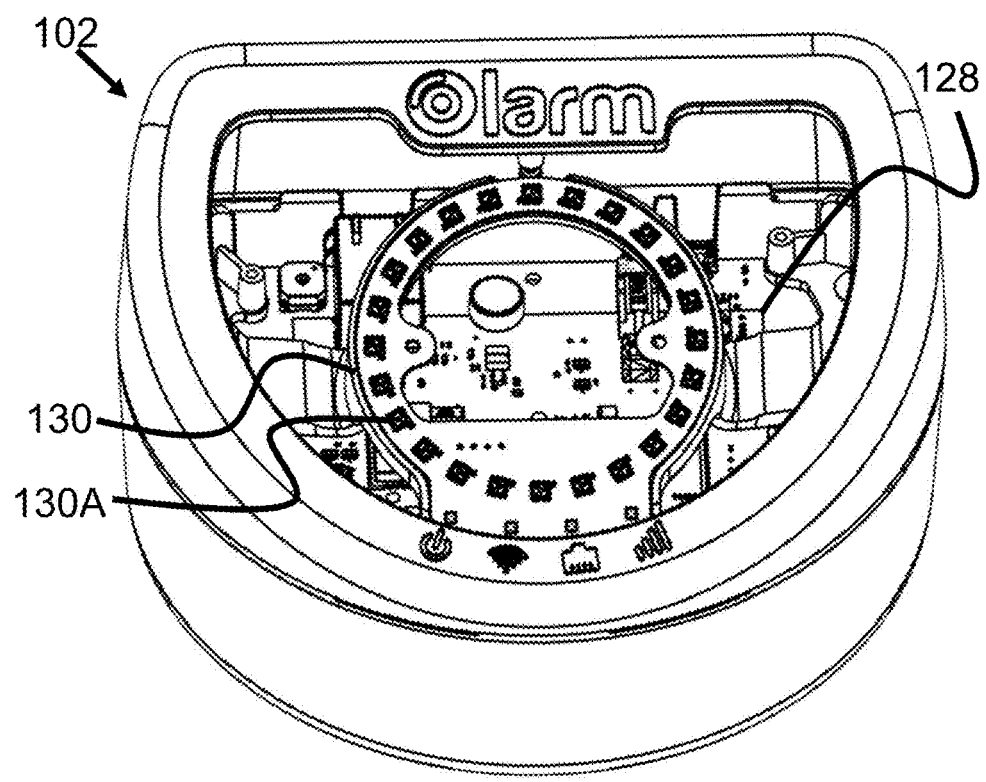
FIG. 7 illustrates a representation of a hub device of a security system according to one embedment of the present invention.
Figure 8:
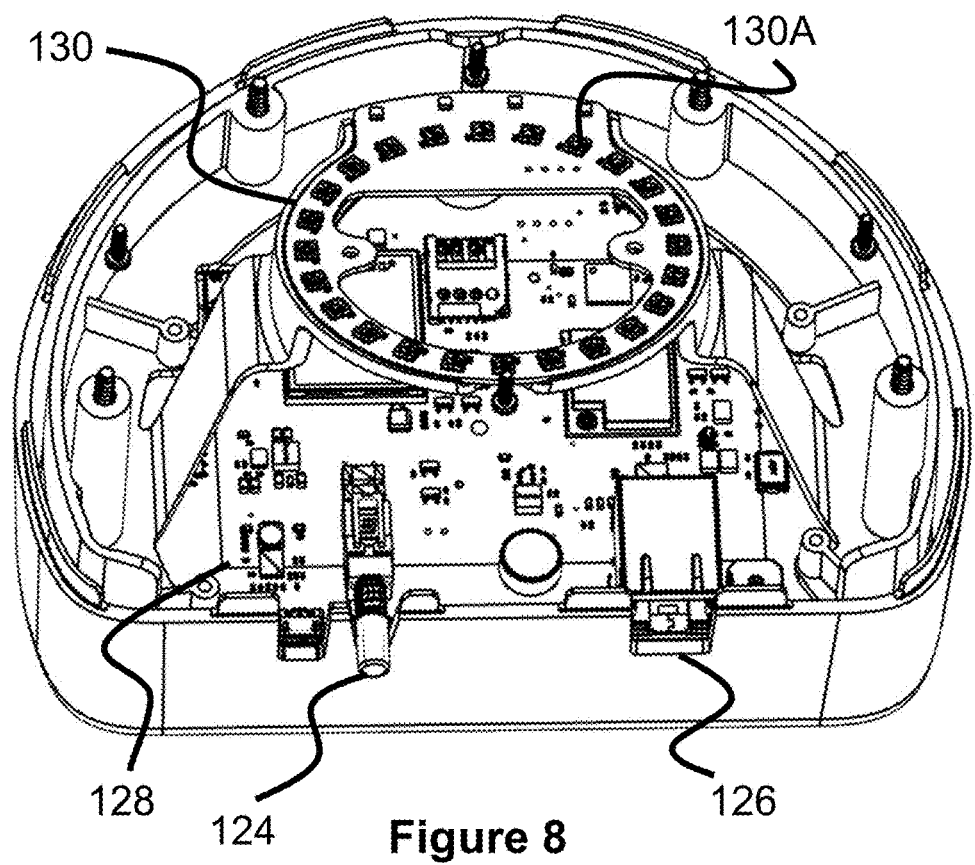
FIG. 8 illustrates a representation of a hub device of a security system according to one embedment of the present invention.
Figure 9:
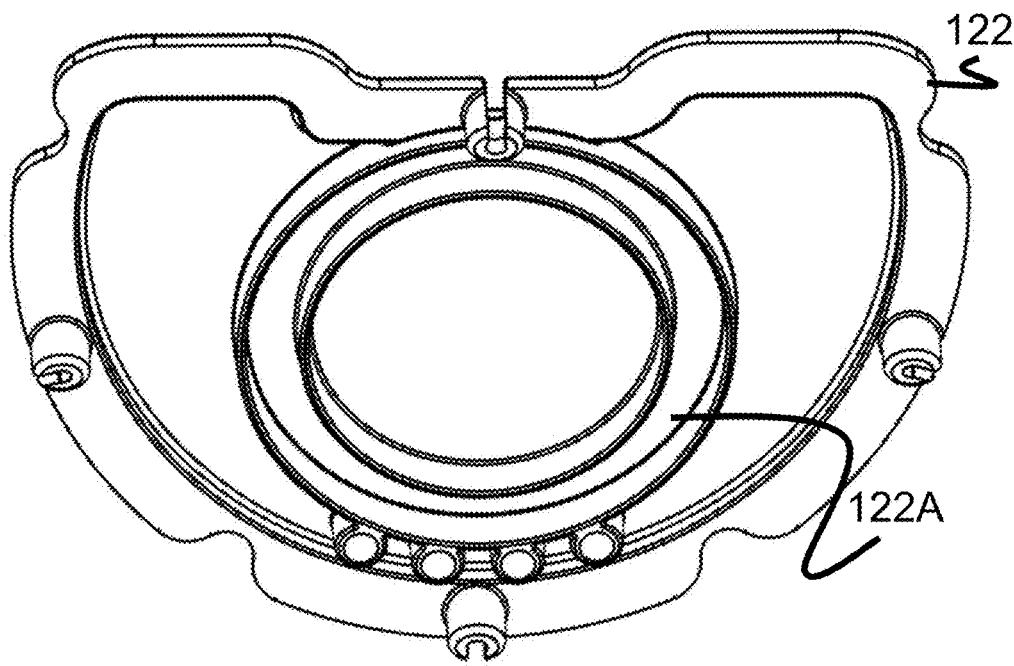
FIG. 9 illustrates a representation of a component of a hub device of a security system according to one embedment of the present invention.

FIG. 2 illustrates an example of a residence building 10 in which the system 100 is set up within. In this example, the hub device 102 is located in a common room and is wirelessly connected to a nearby Wi-Fi router 106. The sensor devices 104 are located in the example positions of a window 16 in a bedroom 16, a front door 14, and on a garage door 18. However, it should be understood that a variety of different sensor positions are also possible, such as under a sink for water detection, on a wall, or on a ceiling.

FIGS. 3-9 illustrate various aspects of the hub device 102, which acts as a central communication and control point between the sensor devices 104 and the server 114. The hub device 102 preferably includes a top housing 120A that mates with a bottom housing 120B to enclose a circuit board 128 that includes features common on a computer-like device, including a processor, storage memory, a wireless communication antenna (for Wi-Fi, Bluetooth, and/or mesh RF communications), a wired LAN connection 126, a power button 124, and other known components. These components allow the hub device 102 to execute an operating system and security system software instructions that execute the methods described in this specification, among other features.

The hub device 102 may also include a circular fixture 120 that supports a plurality of LEDs 130A disposed entirely around the fixture 120 and that are located within groove 122A of the polymer window or shield 122. These LEDs are connected to the circuit board 128 and can be activated in various patterns to shine through the shield 122, communicating information to the user such as whether the system is armed or disarmed. In one specific example, the hub device 102 measures a signal strength of a sensor device 104 relative to the hub device 102 and/or another sensor device 104 and illuminates a number of LEDs that correspond to that signal strength, allowing the user to help select the best placement of a sensor device 104. Since the sensor devices 104 can relay sensor data to the hub device 102 via a mesh network, this type of signal indication can help show a user whether a sensor device 104 has a strong signal path back to the hub device 102.

Figure 10:
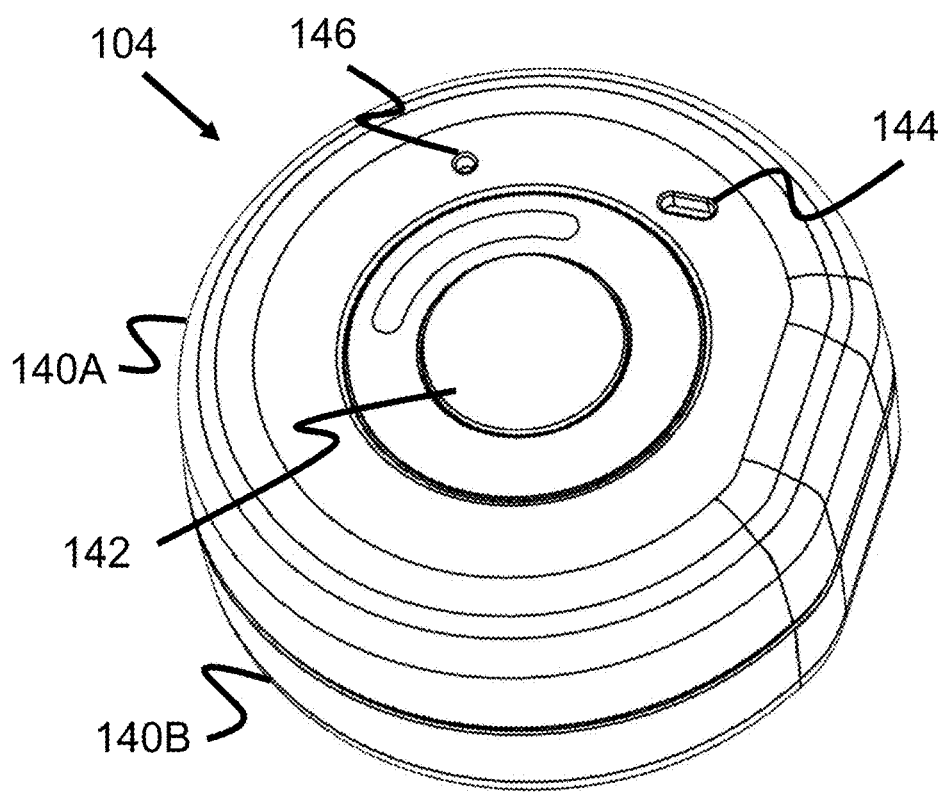
FIG. 10 illustrates a representation of a sensor device of a security system according to one embedment of the present invention.
Figure 11:
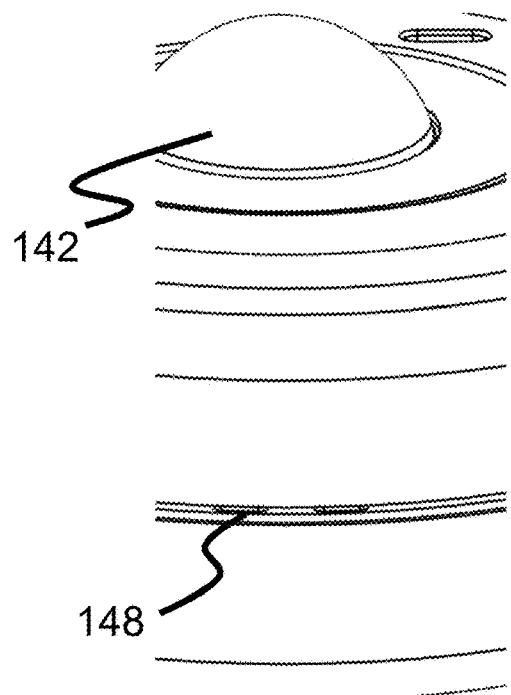
FIG. 11 illustrates a representation of a sensor device of a security system according to one embedment of the present invention.
Figure 12:
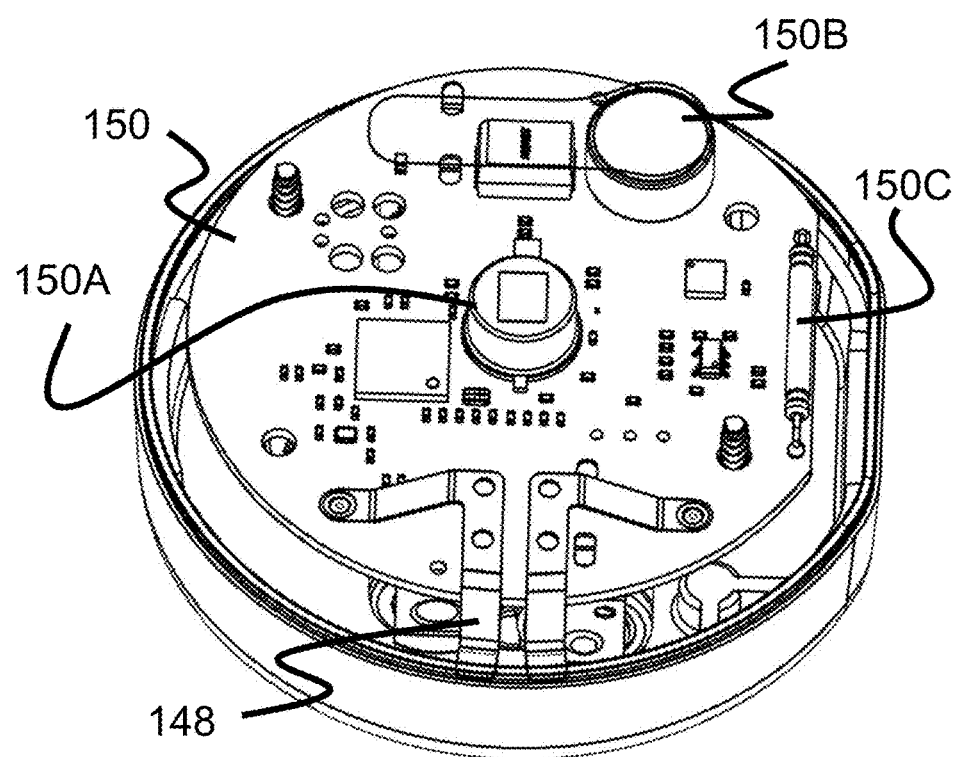
FIG. 12 illustrates a representation of a sensor device of a security system according to one embedment of the present invention.

FIGS. 10-12 illustrate various views of the sensor device 104 that can be fixed to a variety of different objects so as to allow one or more of its internal sensors to monitor a room or entrance to the building 10. The sensor device includes an upper housing 140A and a lower housing 140B that enclose a circuit board 150 connected to a power supply (e.g., batteries). Preferably, the circuit board 150 includes features common on a computer-like device, including a processor, storage memory, a wireless communication antenna (for Wi-Fi and/or mesh RF communications), and other known components. These components allow the sensor device 104 to execute an operating system and security system software instructions. Preferably, the sensor device 104 and circuit board 150 further include a plurality of different sensor types. For example, the sensor device 104 may include a motion sensor for sensing movement of the sensor device 104 itself, a motion sensor for sensing motion of nearby objects other than the sensor device 104, a water leak sensor, an alarm sound sensor, a temperature sensor, and a Bluetooth signal sensor. The inclusion of all these sensors on a single device allows the device to collect and monitor data for multiple purposes and can allow for more sophisticated methods of operating the security system 100 that were not possible with prior art security systems.

Turning first to the motion sensor for sensing movement of the sensor device 104, this sensor can be a vibration/tilt sensor 150C, such as a SW-520D, or a gyroscopic sensor. As the sensor device 104 is moved, the motion sensor detects the movement and the sensor device 104 relays that data to the hub device 102 for further use.

The motion sensor for detecting movement around the sensor device 104 can be accomplished via a passive infrared sensor 150A which is positioned under the dome-shaped and at least partially transparent motion sensor cap 142. This allows the sensor device 104 to monitor movement within the line of sight of the sensor cap 142 and relay that data to the hub device 102 for further use.

The water leak sensor may be formed from two conductive metal leads 148 that are electrically connected to the circuit board 150, but also each have distal ends that are exposed through the sensor housing, as seen in FIGS. 11 and 12. The sensor device 104 can be placed in a location in which water leaks may occur (e.g., under a sink), and if water contacts the leads 148, it completes their circuit, thereby signaling the presence of water to the sensor device 104 and is relayed on to the hub device 102.

The alarm sound sensor may include a microphone 150B that is connected to a digital audio converter on the circuit board 150. While the microphone 150B alone will receive a wide range of sound frequencies, the software executed by the sensor device 104 or hub device 102 can be configured to detect and thereby alert the user when the alarm of another device, such as a smoke detector is activated. For example, the sensor device 104 can continuously analyze sound (or forward on data to the hub/server for analysis) for sounds above a predetermined decibel level that repeat over a predetermined interval (e.g., a sound above 45 dB that repeats within 5 second intervals). In another example, the sensor device 104 can continuously analyze sound for frequencies within a predetermined frequency range within a predetermined decibel range, either instead of monitoring for a repeating sound or in addition. More specifically, the sensor device 104 can monitor for a sound of about 3 kHz (e.g., a range within 2.9 kHz-3.2 kHz) and/or 520 Hz (e.g., a range within 500 Hz-550 Hz), and for those frequencies within a decibel range of about 45 dB to 120 dB. Additionally, the sensor device 104 can analyze the sound from the microphone 150B to detect other events, such as a dog barking or a baby crying. Since these non-alarm events have greater variation in their sound levels and frequencies, it may be necessary to "train" the sensor device 104 by placing the sensor device 104 near the sound (e.g., barking dog, crying baby) and indicating to the system 100 (e.g., via a user's cell phone app) that the event is occurring. The system 100 can analyze the recorded audio to determine a specific frequency range and decibel level that the event is likely to occur in, then store those ranges for monitoring purposes.

The temperature sensor can be a standard temperature sensor chip, such as an LM135, that is connected to the circuit board 150 and preferably is isolated from heat generated from the other components of the sensor device 104 so as to obtain an accurate temperature reading of the environment in which it is installed in.

The Bluetooth sensor is preferably a Bluetooth transceiver chip, such as CYW20735B1, which is capable of transmitting and receiving Bluetooth signals, while also measuring the signal strength of those signals. This Bluetooth transceiver chip allows registered user's phone to be connected and/or monitored by the sensor devices 104, allowing the system 100 to track the general position of the user within the building 10 (i.e., to track what sensor device 104 the user and their phone are closest to). As described later, this position tracking can help the system 100 determine whether it should be automatically set to an "armed away," "armed stay," or "disarmed" mode.

In one aspect of the present invention, the system 100 monitors the presence, absence, and sleeping status of the users registered with the system 100 and then automatically will set the system 100 to a predetermined mode. For example, if the system 100 determines that all registered users have left the residence/building, the system 100 will be automatically set to an "armed away" mode in which window, door, and motion sensors are activated. In another example, if the system 100 determines that all registered users are home but are sleeping, the system 100 will be automatically set to an "armed stay" mode in which the door and window sensors are activated, but not internal motion sensors. In yet another example, if the system 100 determines that all registered users are home but are not sleeping, the system 100 will be automatically set to a "disarmed" mode in which all door, window, and motion sensors are disarmed.

Generally, in order to perform any of the previously-described automatic arming/disarming (i.e., arming/disarming without specific instructions from the user), the system 100 must be set up for the user, including important information associated with a user. This setup process may be accomplished via an app on a phone or directly connecting to a webpage served up by the hub device 102 or server 114.

Figure 13:
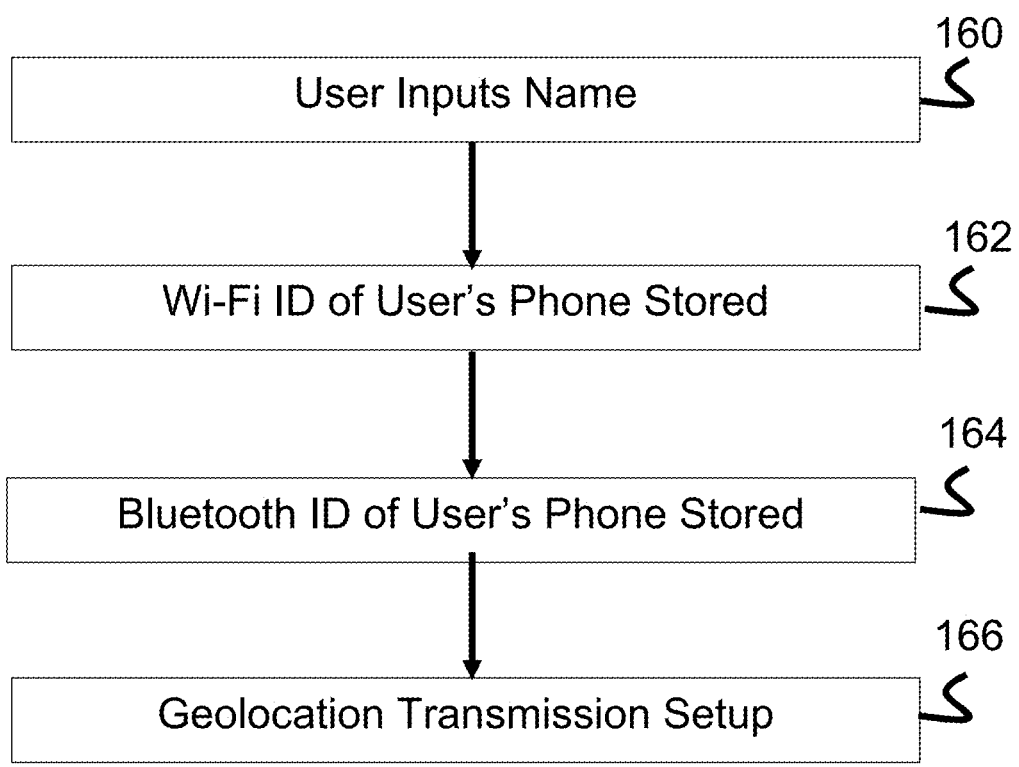
FIG. 13 illustrates a flow chart for setting up a registered user according to one embedment of the present invention.

In one example, the setup process may include at least some of the information and processes as seen in FIG. 13. First, the user may optionally input their name or a similar common identification for their reference (e.g., creating a user profile), as seen in 160, and this information is stored in one or more data files (e.g., a database located on the server 114). Next, the Wi-Fi identification of the user's phone is determined and stored in the one or more datafiles, as seen in 162. Preferably, this identification includes the common network name of the phone and/or its MAC address on the network. If the user is performing this setup process from their own phone, the app may obtain this information directly from the phone's operating system. Alternately, the phone or setup device can scan the network and provide a list of network devices for the user to select.

In 164, the Bluetooth ID of the user's phone is stored in the one or more data files (preferably a database on the server 114). Preferably, this Bluetooth identification includes the common Bluetooth name of the phone and/or the Bluetooth MAC address (BD_ADDR). Additional information may also be obtained at this time, such as the power class of the phone's Bluetooth chip, which may used later to help determine movement of the phone based on signal strength. Again, this information may be obtained directly from the app installed on the phone or may be obtained via the hub device 102 (e.g., from a Bluetooth pairing process).

In 166, the app on the user's phone is configured to periodically transmit its geolocation (e.g., location as determined by the phone's onboard GPS chip) or to transmit it at specific times after receiving a request from the server 114. This data can be sent to either the server 114 or the hub device 102 and can be stored in the one or more data files. Preferably, the app on the user's phone is configured to send a data message and/or the phone's geolocation data when the user leaves or enters a predetermined geographic region specified by the user. Preferably, the user has selected this region to a size that encompasses their residence/building.

The previously described setup information can be stored in one or more data files located on either the hub device 104, the server 114, or both devices. Additionally, this setup process can be performed for multiple users and for multiple devices.

Figure 14:
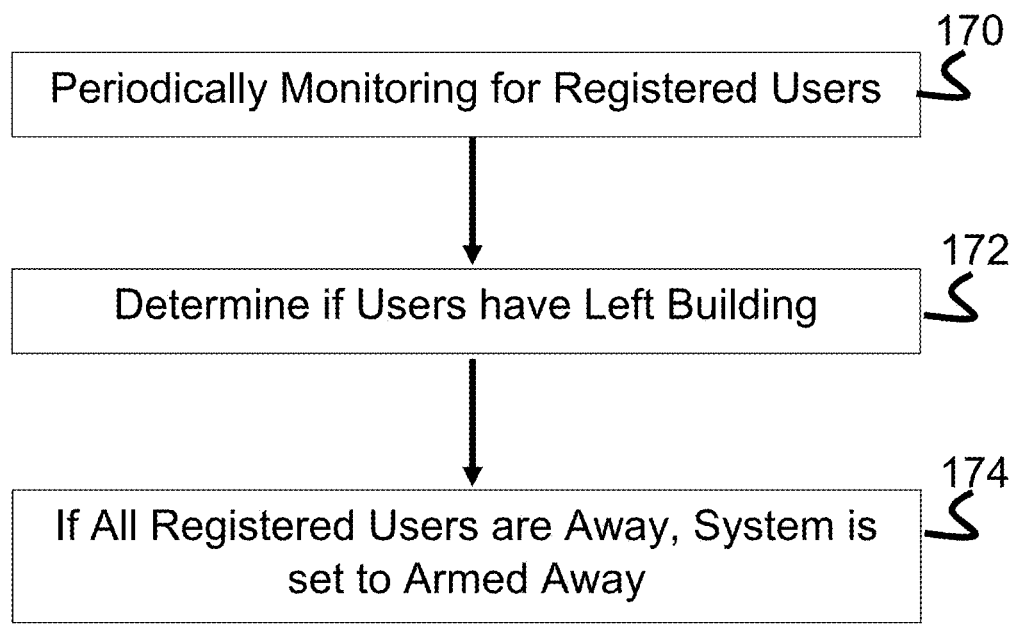
FIG. 14 illustrates a flow chart of a method for automatically arming a security system according to one embedment of the present invention.

FIG. 14 illustrates a flow chart showing the process to automatically arm the system 100 in an "armed away" state. In step 170, the system periodically monitors for the continued presence of the registered users and stores this data in one or more data files (e.g., user presence is stored every two minutes). Both the hub device 102 and/or the sensor devices 104 continually monitor for the Wi-Fi and Bluetooth identification signals of the phones/devices previously setup by the users. This data can be stored in a database with additional information (e.g., a date stamp) for later reference.

In step 172, the system 100 determines if all registered users have left the residence/building 10. This determination can be made by the hub device 102 or the remote server 114. In one method, when the hub device 102 or server 114 notes that a registered user's phone's Wi-Fi is no longer detected on the user's Wi-Fi network by the system 100 (e.g., by the hub device 102 or by the sensor devices 104), the system request the geolocation of that registered user's phone. In another method, instead of requesting geolocation data based on the user's phone not showing up on the user's Wi-Fi network, the geolocation data is requested when neither the hub device 102, nor the sensor devices 104 detect the Bluetooth ID of the user's phone. In yet another method, the geolocation data is requested after the user's phone is not detected via both Wi-Fi and Bluetooth.

Once received, the geolocation data is stored and then compared with the predetermined geographic location surrounding their building (e.g., GPS coordinates of each can be compared). If the geolocation data is outside of the bounds of the building's location, the user is designated as "away" and is tagged as such in one or more data files. If the user's phone is unable to provide its geolocation data to the system 100, the user's status is designated as "unknown".

This monitoring and presence/position determination is continuously performed for each registered user and stored in a data file in the system. Once all users are accounted for or determined to be outside of the predetermined geographic location of the building and do not have an "unknown" status from a lack of geolocation data, the system 100 will set itself to an "armed away" status, as seen in step 174. Typically, an "armed away" status will "activate" sensors monitoring entry into the building (windows, doors, garage doors) and movement or persons within the building. Any such movement or door/window entry will result in an alarm condition, which may include an audible alarm and an alarm notification on the user's phone.

Figure 15:
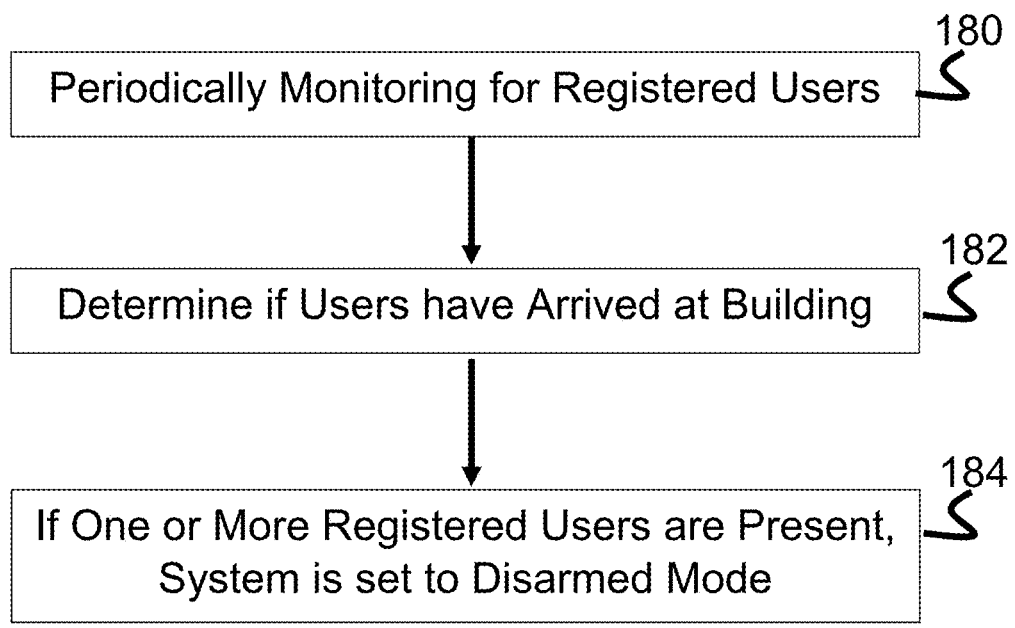
FIG. 15 illustrates a flow chart of a method for automatically disarming a security system according to one embedment of the present invention.

FIG. 15 illustrates a flow chart showing the process to automatically disarm the system 100 from an "armed away" state to a "disarmed" state. In step 180, the system 100 periodically monitors for the presence of the one or more registered users and stores this data in one or more data files (e.g., user presence is stored every two minutes). Both the hub device 102 and/or the sensor devices 104 continually monitor for the Wi-Fi and Bluetooth identification signals of the phones/devices previously setup by the users. This data can be stored in a database with additional information (e.g., a date stamp) for later reference.

In step 182, the system 100 determines if one or more of the registered users have arrived at the residence/building 10. This determination can be made by the hub device 102 or the remote server 114. In one method, when the hub device 102 or server 114 notes that a registered user's phone's Wi-Fi is now detected on the user's Wi-Fi network by the system 100 (e.g., by the hub device 102 or by the sensor devices 104), the system request the geolocation of that registered user's phone. In another method, instead of requesting geolocation data based on the user's phone showing up on the user's Wi-Fi network, the geolocation data is requested when the hub device 102 or the sensor devices 104 detect the Bluetooth ID of the user's phone. In yet another method, the geolocation data is requested after the user's phone is detected via both Wi-Fi and Bluetooth.

Once received, the geolocation data is stored and then compared with the predetermined geographic location surrounding their building (e.g., GPS coordinates of each can be compared). If the geolocation data of the user's phone is inside of the bounds of the building's location, the user is designated as "Present" and is tagged as such in one or more data files. If the user's phone is unable to provide its geolocation data to the system 100, the user's status is designated as "unknown".

This monitoring and presence/position determination is continuously performed for each registered user and stored in a data file in the system 100. Once one or more users are accounted for and determined to be inside of the predetermined geographic location of the building 10 and do not have an "unknown" status from a lack of geolocation data, the system 100 will set itself to a "disarmed" status, as seen in step 184. Typically, a "disarmed" status will "deactivate" sensors monitoring entry into the building (windows, doors, garage doors) and movement or persons within the building. As noted, if a user's status is "unknown," meaning that the user's phone's Wi-Fi and/or Bluetooth identification is detected but the geolocation data could not be obtained, the alarm status is not set to the "disarmed" mode. This feature may help avoid an unregistered third party from deactivating the system 100 by faking or forging the Wi-Fi and Bluetooth identifications.

Figure 16:
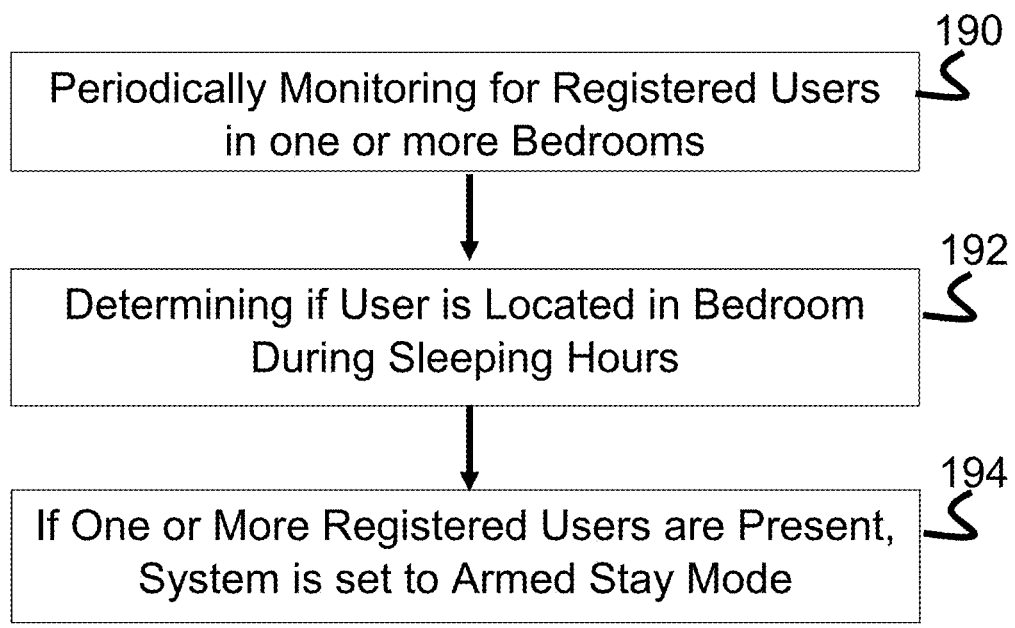
FIG. 16 illustrates a flow chart of a method for automatically arming a security system when registered users are believed to be asleep, according to one embedment of the present invention.

FIG. 16 illustrates a flow chart showing the process to automatically arm the system 100 to an "armed stay" state. In step 190, the system 100 periodically monitors for the continued presence of the registered users and their location within the building 10, then stores this data in one or more data files. Monitoring the general presence of one or more registered users is described with regard to FIGS. 14 and 15. However, the system 100 further monitors whether the user's phone is located within a user's bedroom during predetermined sleeping hours, as seen in step 192.

More specifically, during the setup process, the user specifies that one or more sensor devices 104 are located in that user's bedroom (e.g., the security system 100 associates a sensor device 104 identification with the user's bedroom). Further, the user specifies a predetermined "sleeping" time range for each day during which the user typically goes to sleep. Both the designated bedroom sensor devices 104 and the predetermined sleeping time range are stored in one or more data files (e.g., on the hub device 102 or server 114). The system 100 (i.e., the hub device 102 or server 114) will monitor the bedroom-designated sensor devices 104 for each user starting at the designated sleeping time. If the bedroom-designated sensor devices 104 for that user detects the Bluetooth identification for that user's phone and that Bluetooth signal maintains a substantially constant signal strength over a predetermined period of time, that user is determined to be sleeping, as noted in step 194, and the system 100 is set to the "armed stay" mode. Optionally, the system 100 may further monitor the IR motion sensor from the sensor device 104 for that bedroom (or for the sensor devices for the entire building) for activity. Switching the system 100 to the "armed stay" mode may be delayed or not implemented until no motion is detected in the bedroom or entire house. Typically, the "armed stay" mode will "activate" sensors monitoring entry into the building (windows, doors, garage doors) but not movement sensors tracking movement of people within the building 10. Any movement of a door/window will thereby result in an alarm condition, which may include an audible alarm and an alarm notification on the user's phone.

Optionally, the system 100 can further store a setting in one or more data files that specifies which user or users should be monitored for its sleep determination in order to switch the system 100 to its "armed stay" mode. For example, the system 100 can be setup to wait for all registered users to be determined to be sleeping, or only predetermined users (e.g., parents, not kids).

Figure 17:
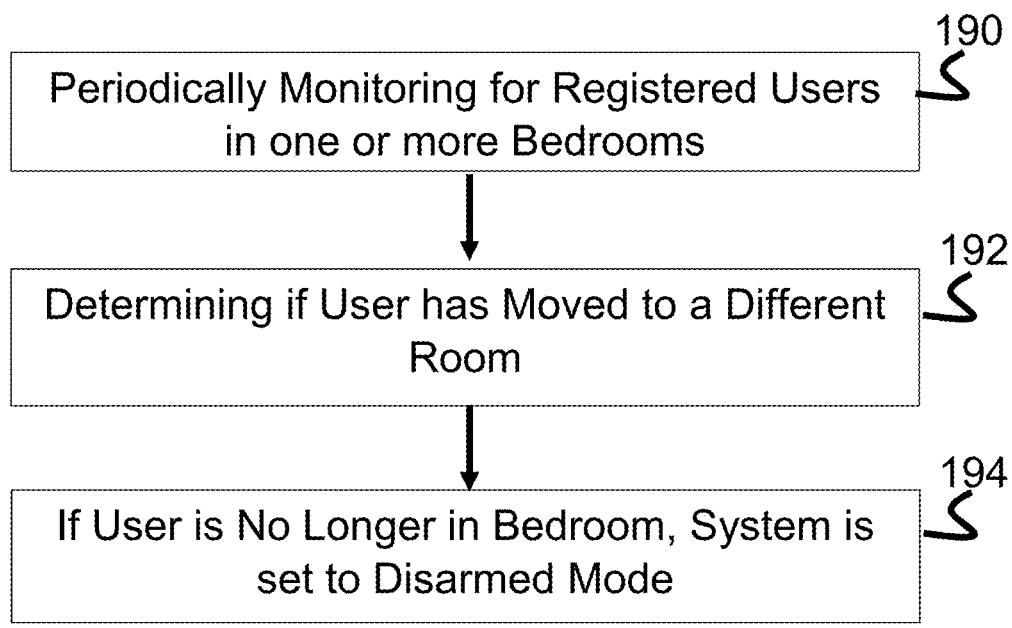
FIG. 17 illustrates a flow chart of a method for automatically disarming a security system according to one embedment of the present invention.

The "armed stay" mode can also be automatically deactivated in the morning when the user wakes up, as seen in FIG. 17. In step 190, the system 100 periodically monitors for the continued presence of the registered users within the bedroom (e.g., via the user's Bluetooth identification signal received by a sensor device 104 designated as a bedroom sensor for that user). If the user's phone's Bluetooth signal drops for a predetermined period of time and the user's phone's Bluetooth signal is received and/or increased in strength on another sensor device 104 located in another area of the house, the user is determined to be awake, as seen in step 192. At that time, the system 100 is set to its "disarm" mode (step 194) in which the sensors monitoring entry into the building (windows, doors, garage doors) are "deactivated" (i.e., set so as to not trigger an alarm condition).

Figure 18:
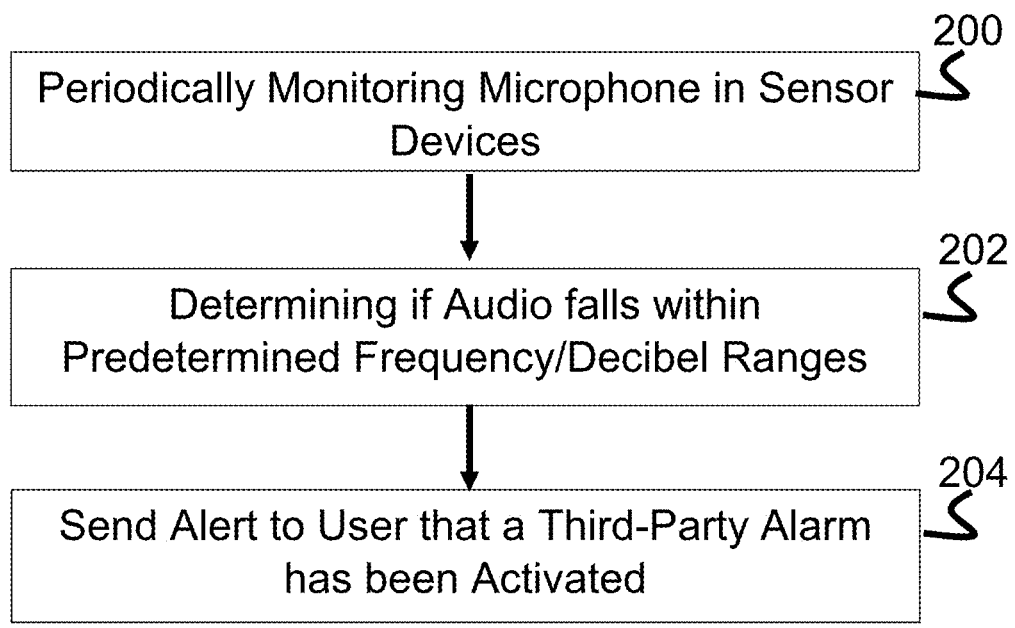
FIG. 18 illustrates a flow chart of a method for monitoring for a third-party alarm according to one embedment of the present invention.

As seen in the flow chart of FIG. 18, the system 100 may also monitor the building 10 for activation of an alarm from a separate system, such as a fire alarm. When an alarm from a separate system is detected, a message or notification can be sent to the user's phone to alert about the condition.

More specification, each sensor device 104 preferably includes a microphone 150B that is connected to a digital audio converter on the its circuit board 150. The sensor device 104 is configured to monitor the input from the microphone 150B and, when certain frequency ranges decibel levels are detected (step 202), transmit a data message to the hub device 102 which relays or repackages that data message to the server 114, allowing any of the devices to send an alert directly to the user's phone (step 204). In one example, the sensor device 104 can monitor for a sound of about 3 kHz (e.g., a range within 2.9 kHz-3.2 kHz) and/or 520 Hz (e.g., a range within 500 Hz-550 Hz), and for those frequencies within a decibel range of about 45 dB to 120 dB. In this example, the system 100 sends data to the user's phone, causing it to display a message that a fire alarm is occurring in their building 10. Alternately, the sensor devices 104 can monitor for alternate frequency and decibel ranges associated with other events, such as a dog barking or a child crying.

Figure 19:
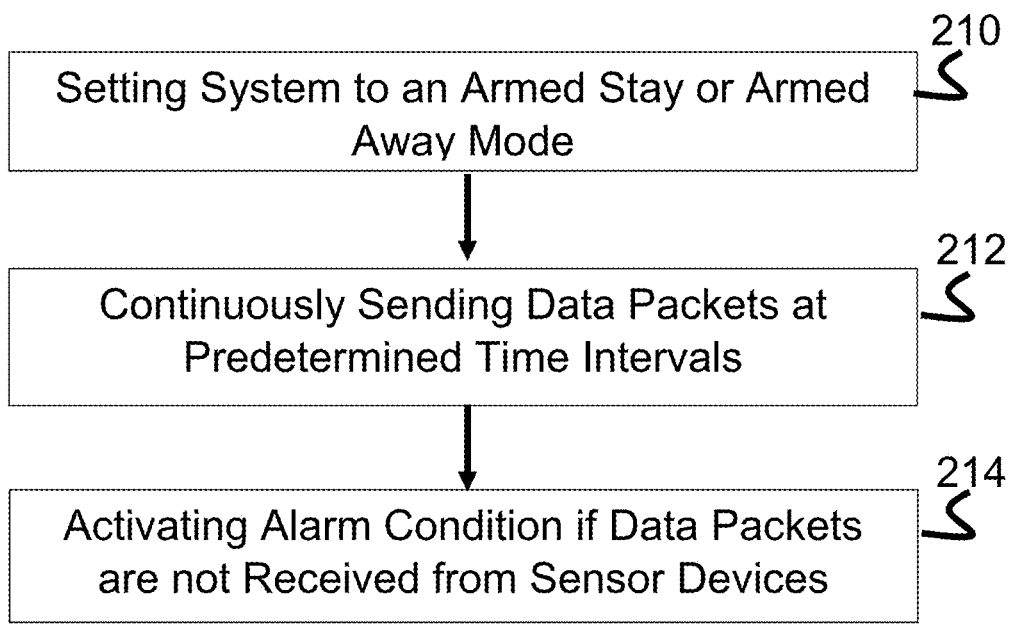
FIG. 19 illustrates a flow chart of a method for preventing interruption of wireless communications between the sensor devices and the hub device according to one embedment of the present invention.

FIG. 19 illustrates a flow chart directed to a method of preventing the wireless communications between the sensor devices 104 and the hub device 102 from being jammed or interrupted. As previously discussed, the sensor devices 104 preferably form a mesh network with each other so as to convey their data communications to the hub device 102. If an intruder is aware that the system 100 relies on wireless communications from its sensor device 104, a radiofrequency jammer or similar device may be used to interrupt communications between a sensor device 104 and the hub device 102. This may allow the intruder to interrupt a sensor device 104 (e.g., window, door, or motion sensor) and enter the building 10 without setting off the alarm.

To address this issue, the system 100 uses a communication protocol that triggers the alarm state of the system if the sensor devices 104 are interrupted. Specifically, the protocol is initiated when the system is set to an "armed stay" or "armed away" mode (step 210). Next, all active sensor devices 104 begin sending data packets to the hub device 102 at relatively short, predetermined intervals (e.g., 1 minute), as seen in step 212. After the hub device 102 receives a data packet from a specific sensor device 104, it times or counts down the predetermined time interval expected for the next data packet. These data packets may include information identifying the sensor and readings from its various sensors. As seen in step 214, if the wireless communications from one or more of the sensor devices 104 are not received by the hub device 102 at the predetermined time interval (e.g., 1 minute), the hub devices 102 activates a second countdown time for a second predetermined period of time (e.g., 1 minute). If that sensor device 104 is able to reestablish communications within that second predetermined time period and transmit a data packet of sensor data, an alarm mode will not be activated. However, if the second countdown timer for the second predetermined time period expires without the hub device 102 receiving a further data packet, the system 100 will activate an alarm mode. In this respect, the alarm mode of the system 100 will likely not be activated by unintentional and brief radio interference but will be activated by sustained, intentional interference by an attempted intruder.

Figure 20:
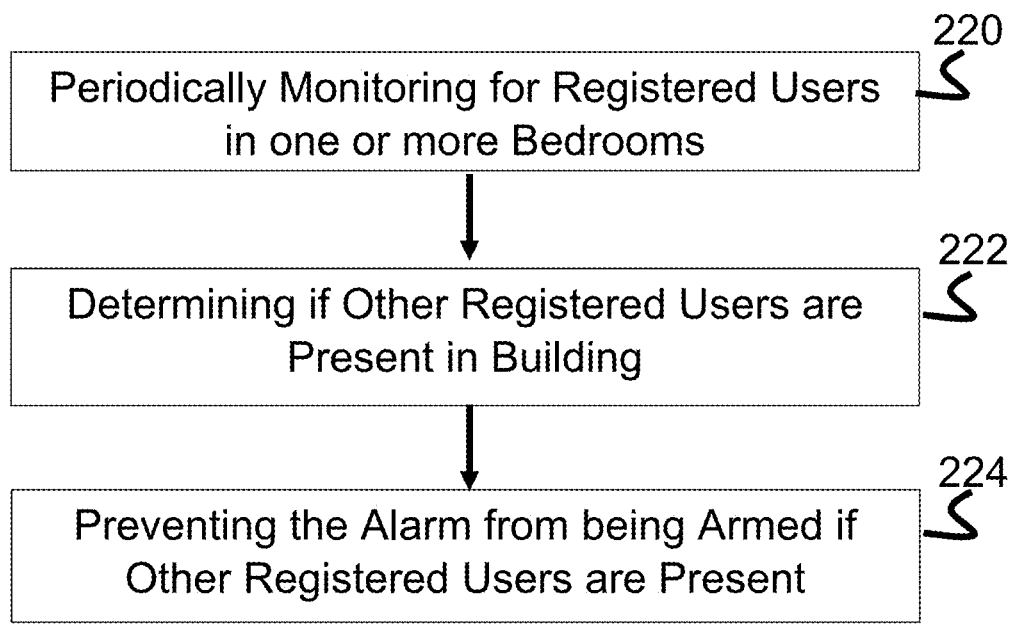
FIG. 20 illustrates a flow chart of a method for determining if other registered users are present in the building according to one embedment of the present invention.

FIG. 20 illustrates a flow chart directed to a method of preventing the system 100 from becoming manually armed if a registered user is still in the building. Prior art security systems typically rely on internal motion sensors to prevent a security system from arming when users are still on the premises. Specifically, if the motion detectors detect motion, the system will not arm. However, if a person is sleeping or is otherwise not in the line of sight of a motion sensor, the security system will activate and therefore be set off when the user moves into view of a motion sensor. The present security system can help further avoid these situations by monitoring additional information before allowing the security system 100 to arm.

For example, as previously discussed, the security system 100 stores the Wi-Fi identification and Bluetooth identification for each user's phones in one or more data files. This information allows the system to periodically monitor for these identification signals and record the presence or lack thereof of each registered user in one or more data files, as seen in step 220. When the system receives an instruction from a user to arm the system 100, the system reviews its one or more data files to determine if any other registered users are present (step 222). If any of the other registered users are present (i.e., if the system 100 detects any of the remaining user's Wi-Fi or Bluetooth identification signals), the user attempting to activate the alarm will either receive a warning about possible registered users still being in the building 10, the alarm will be unable to be armed, or both (step 224).

This method can be further expanded to also monitor for the phones of guests and thereby prevent the system 100 from becoming armed unless those guests are no longer present. Specifically, the sensor devices 104 and the hub device 102 are configured with a Bluetooth transceiver, and can thereby monitor for Bluetooth enabled devices. When a new Bluetooth-enabled device is detected, the system 100 can receive information that may help identify it as a phone. For example, the system 100 may receive its MAC address, manufacturer name, etc. When the user attempts to arm the system 100, the system 100 reviews its data files for the presence of this new Bluetooth device and presents a warning on the user's phone that a potential unregistered phone is located on the premises. The phone my provide the user with an "ignore" option, which stores data in one or more data files indicating that this device can be ignored during future arming events.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In accordance with certain aspects of the present invention, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. In one or more exemplary embodiments, the functions described may be implemented in hardware, software, firmware, or any combination thereof. If implemented in software, the functions may be stored on or encoded as one or more instructions or code on a computer readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

Aspects of the present invention are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present invention may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

As used herein, computer program products comprising computer-readable media including all forms of computer-readable medium except, to the extent that such media is deemed to be nonstatutory, transitory propagating signals. It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. The disclosure is not intended to be limited to the aspects shown herein but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

While various embodiments of the present invention have been described in detail, it will be apparent to those skilled in the art that the present invention can be embodied in various other forms not specifically described herein.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for setting a security system of a building to an armed mode, comprising:
    storing a username in one or more data files on a remote server;
    storing a Media Access Control address for a user's cellular phone in said one or more data files on said remote server;
    storing a Bluetooth Address identifier for said user's cellular phone in said one or more data files on said remote server;
    storing building geolocation data indicating an area encompassing said building;
    monitoring said Media Access Control address and said Bluetooth Address of said user's cellular phone with a plurality of sensor nodes positioned in said building; said plurality of sensor nodes configured to relay sensor data to said remote server;
    determining that said Media Access Control address and said Bluetooth Address of said user's cellular phone are not detected by any of said plurality of sensor nodes positioned in said building;
    transmitting a request for geolocation data from said remote server to said user's cellular phone;
    transmitting said geolocation data of said user's cellular phone from said user's cellular phone to said remote server;
    comparing with said remote server said geolocation data of said user's cellular phone with said building geolocation data; and,
    if said geolocation data of said user's cellular phone is located outside of said building geolocation data, setting a status of said security system to an armed away mode; said armed away mode activating an alarm condition of said security system when at least one sensor of at least one sensor node is triggered.

2. A method for setting a security system of a building to a disarmed mode, comprising:
    storing a username in one or more data files on a remote server;
    storing a Media Access Control address for a user's cellular phone in said one or more data files on said remote server;
    storing a Bluetooth Address identifier for said user's cellular phone in said one or more data files on said remote server;
    storing building geolocation data indicating an area encompassing said building;
    monitoring said Media Access Control address and said Bluetooth Address of said user's cellular phone with a plurality of sensor nodes positioned in said building; said plurality of sensor nodes configured to relay sensor data to said remote server;
    determining that said Media Access Control address and said Bluetooth Address of said user's cellular phone are detected by any of said plurality of sensor nodes positioned in said building;
    transmitting a request for geolocation data from said remote server to said user's cellular phone;
    transmitting said geolocation data of said user's cellular phone from said user's cellular phone to said remote server;
    comparing with said remote server said geolocation data of said user's cellular phone with said building geolocation data; and,
    if said geolocation data of said user's cellular phone is located near or inside of said building geolocation data, setting a status of said security system to a disarmed mode; said disarmed mode failing to activate an alarm condition of said security system when at least one sensor of at least one sensor node is triggered.

3. The method of claim 1, wherein when said status of said security system is set to said armed away mode, said plurality of sensor nodes each continuously transmit data packets to a sensor hub at a first predetermined time interval; and wherein when sensor hub fails to receive a data packet from one of said plurality of sensor nodes, said sensor hub activates a countdown time for a second predetermined period of time; wherein expiration of said second predetermined period of time without receiving said data packet from said one of said plurality of sensor nodes activates said alarm condition of said security system.

4. The method of claim 1, wherein at least some of said plurality of sensor nodes include a microphone and are configured to monitor for a sound in a range within 2.9 kHz-3.2 kHz and/or a range within 500 Hz-550 Hz, each within a decibel range of about 45 dB to 120 dB.

* * * * *